Dec. 2, 1924.

R. E. MARBURY

RADIOCONDENSER

Filed Nov. 26, 1920

1,517,370

WITNESSES:

INVENTOR
Ralph E. Marbury.
BY
ATTORNEY

Patented Dec. 2, 1924.

1,517,370

UNITED STATES PATENT OFFICE.

RALPH E. MARBURY, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

RADIOCONDENSER.

Application filed November 26, 1920. Serial No. 426,432.

*To all whom it may concern:*

Be it known that I, RALPH E. MARBURY, a citizen of the United States, and a resident of Edgewood Park, in the county of Allegheny and State of Pennsylvania, have invented a new and useful Improvement in Radiocondensers, of which the following is a specification.

My invention relates to condensers, more particularly to condensers embodying a solid dielectric, and especially adapted for use in radio communication systems.

Condensers of this type are generally constructed of alternate layers of thin sheets of solid dielectric, such as mica, alternating with thin sheets of metal foil, such as copper. The assembled layers are then pressed between clamps to reduce the air spaces between the various layers. Such condensers have rather high losses due to air pockets between the metal foil and mica sheets on account of the lack of intimate contact between the mica and the metal. This is attributable to the irregularities in the mica which are inherent in the plate-like structure thereof.

It has been attempted to overcome this difficulty by forming condenser bodies with alternate layers of mica and copper having sheets of lead foil between the mica and copper layers. The assembly was compressed at a very high pressure to cause the lead foil to flow and fill up the irregularities in the mica, displacing any air present. Since the surface of the mica sheet is irregular, such tremendous pressures used often caused high spots in the mica to be broken down or crushed. The pressures used also caused cracks to develop in the mica, reducing the efficiency and the life of the condenser.

The present invention obviates such disadvantages, it being among the objects thereof to provide a method of constructing condensers embodying a solid dielectric, which shall have low power losses and be very efficient when used with high frequency currents.

My invention contemplates a method of forming condensers in which the irregular surfaces of the mica remain practically undamaged, and in which the irregularities are entirely filled in, and no air pockets are allowed to remain. In practising my invention, I provide sheets of metal foil, which are coated with a thin film of an easily fusible metal and then stacked with alternate layers of mica to form a condenser body. The condenser body is placed under pressure, heat being applied to soften or melt the easily fusible metal, and a moderate pressure applied to consolidate the various layers of material and cause the fusible metal to flow into the irregularities in the surface of the mica.

Figure 1:
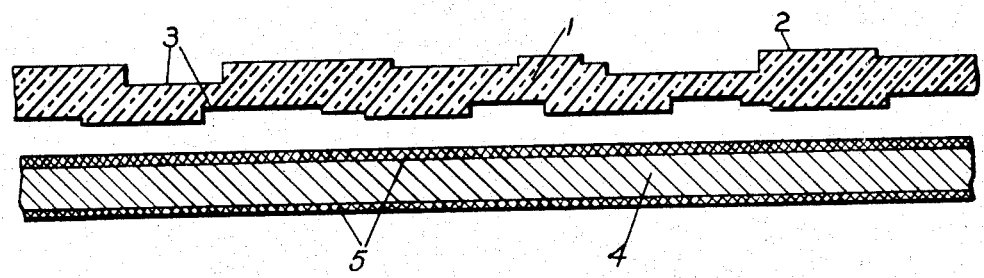
Figure 2:
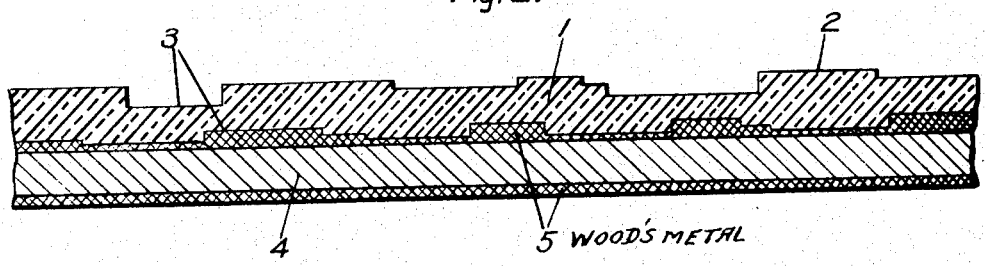

In the accompanying drawings forming a part hereof and which illustrate a specific embodiment of my invention, Fig. 1 is an enlarged sectional view of a sheet of mica and a sheet of coated metal foil, and Fig. 2 is a similar view showing the intimate union of mica and metal after the condenser is completed.

Mica sheets 1, such as are ordinarily employed in condensers, have irregular shaped projections 2 and depressions 3, exaggerated as shown in the drawings. Such depressions are ordinarily not filled in condensers constructed in accordance with prior methods and constitute air pockets which greatly interfere with the proper functioning of the condenser. My invention utilizes a thin foil 4 of any suitable metal, such as copper, which is coated on both sides with a thin film of easily fusible metal 5, such as Wood's metal having a melting point of about 75° C.

The film may be of any desired thickness and may be provided in any suitable way. Preferably, I form such film by passing the copper strips through a weak acid solution and then through a molten bath of Wood's metal so as to provide a thin film about 1/1000 of one inch thick on each side thereof. The copper strips may then be punched or cut into plates of proper size and then stacked alternately with sheets of mica in any desired manner. The assembled layers are then placed under a moderate pressure of a few hundred pounds and heat applied to raise the temperature of the condenser body to about 75° C., causing the metal coating to melt and conform to the irregularities 2 and 3 in the surface of the mica, as shown in Fig. 2.

I generally prefer to apply pressure and heat simultaneously but it is immaterial whether the pressure is applied simultaneously with, before, or after the heating. If desired, the heating and pressure may be accomplished more readily by placing the condenser in a vacuum. If desired, a coating of wax may be applied to the condenser before removing from vacuum. The condenser is then clamped while under pressure and allowed to cool.

I generally utilize Wood's metal, which consists of one part cadmium, four parts bismuth, two parts lead and one part tin. Although I prefer to use this metal, which has a melting point of about 75°, my invention is not limited to this specific composition. Similar alloys, embodying the same ingredients and having higher or lower melting points, may be utilized. Different alloys, such for instance, as alloys of cadmium, bismuth and tin may be utilized. The prime consideration is that the metals used be easily fusible, that is, the metals should melt at a low temperature, preferably about 100° C. However, metals of higher metal point, up to say 200° C. are suitable for my purpose.

I claim as my invention:

1. A method of forming condensers which comprises coating sheets of metal foil with a metal fusible below 200° C, and assembling a suitable number of such foils with alternate sheets of solid dielectric.

2. A method of forming condensers which comprises coating sheets of metal foil with a metal fusible below 200° C, and assembling a suitable number of such foils with alternate sheets of mica.

3. A method of forming condensers which comprises coating sheets of metal foil with an easily fusible metal, and assembling a suitable number of such foils with alternate sheets of solid dielectric and applying heat thereto to fuse said fusible metal.

4. A method of forming condensers which comprises coating sheets of metal foil with an easily fusible metal, assembling a suitable number of such foils with alternate sheets of solid dielectric, applying heat thereto, and placing the assembly under pressure to cause said fusible metal to flow into the irregularities in said dielectric.

5. A method of forming condensers which comprises coating sheets of metal foil with an easily fusible metal, assembling a suitable number of such foils with alternate sheets of solid dielectric, applying heat thereto, and placing the assembly under moderate pressure to cause said fusible metal to flow into the irregularities in said dielectric.

6. A method of forming condensers which comprises coating sheets of metal foil with an easily fusible metal, assembling a suitable number of such foils with alternate sheets of solid dielectric, applying heat thereto, placing the assembly under moderate pressure to cause said fusible metal to flow into the irregularities in said dielectric, and covering said condenser with wax.

7. A method of forming condensers which comprises coating sheets of metal foil with Wood's metal, and assembling a suitable number of such foils with alternate sheets of solid dielectric.

8. A method of forming condensers which comprises coating sheets of metal foil with Wood's metal, assembling a suitable number of such foils with alternate sheets of solid dielectric, and heating to about 75°.

9. A method of forming condensers which comprises coating sheets of metal foil with Wood's metal, assembling a suitable number of such foils with alternate sheets of mica, heating to about 75° C., and placing said assembly under moderate pressure to cause said fusible metal to flow into the irregularities in said mica.

10. A condenser comprising alternate sheets of metal foil and solid dielectric having metal fusible below 200° C. between said sheets.

11. A condenser comprising alternate sheets of metal foil and a solid dielectric having irregularities in the surface thereof, and metal fusible below 200° C. between said sheets and projecting into said irregularities.

12. A condenser comprising alternate sheets of metal foil and mica having metal fusible below 200° C. between said sheets.

13. A condenser comprising alternate sheets of metal foil and mica having Wood's metal between said sheets.

In testimony whereof, I have hereunto subscribed my name this 12th day of November, 1920.

RALPH E. MARBURY.